(12) United States Patent
Jitsui et al.

(10) Patent No.: US 7,469,594 B2
(45) Date of Patent: Dec. 30, 2008

(54) CAPACITANCE-TYPE SENSOR AND OCCUPANT DETECTION SYSTEM

(75) Inventors: Akinori Jitsui, Okazaki (JP); Koji Wato, Obu (JP); Tsutomu Kamizono, Nagoya (JP); Masahiro Taguchi, Hazu-gun (JP); Hiroyuki Ito, Chita (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 11/153,383

(22) Filed: Jun. 16, 2005

(65) Prior Publication Data

US 2006/0005630 A1 Jan. 12, 2006

(30) Foreign Application Priority Data

Jun. 25, 2004 (JP) .............................. 2004-187742

(51) Int. Cl.
*G01B 7/16* (2006.01)
*G01L 1/00* (2006.01)

(52) U.S. Cl. ........................................................ 73/779

(58) Field of Classification Search .................... 73/779
See application file for complete search history.

(56) References Cited

U.S. PATENT DOCUMENTS

| | | | |
|---|---|---|---|
| 4,796,013 A | 1/1989 | Yasuda et al. | |
| 5,618,056 A | 4/1997 | Schoos et al. | |
| 5,851,026 A | 12/1998 | Schoos et al. | |
| 5,987,370 A | 11/1999 | Murphy et al. | |
| 6,043,743 A * | 3/2000 | Saito et al. | 340/562 |
| 6,058,341 A | 5/2000 | Myers et al. | |
| 6,062,642 A * | 5/2000 | Sinnhuber et al. | 297/216.13 |
| 6,079,738 A * | 6/2000 | Lotito et al. | 280/735 |
| 6,101,436 A | 8/2000 | Fortune et al. | |
| 6,138,067 A | 10/2000 | Cobb et al. | |
| 6,186,538 B1 * | 2/2001 | Hamada et al. | 280/735 |
| 6,283,504 B1 * | 9/2001 | Stanley et al. | 280/735 |
| 6,342,683 B1 * | 1/2002 | Aoki et al. | 177/144 |
| 6,345,839 B1 * | 2/2002 | Kuboki et al. | 280/735 |
| 6,490,936 B1 | 12/2002 | Fortune et al. | |
| 6,517,106 B1 * | 2/2003 | Stanley et al. | 280/735 |
| 6,563,231 B1 * | 5/2003 | Stanley et al. | 307/10.1 |
| 6,577,023 B1 * | 6/2003 | Stanley et al. | 307/10.1 |
| 6,609,055 B2 * | 8/2003 | Stanley | 701/45 |
| 6,825,765 B2 * | 11/2004 | Stanley et al. | 340/561 |
| 6,831,565 B2 * | 12/2004 | Wanami et al. | 340/667 |
| 6,927,678 B2 * | 8/2005 | Fultz et al. | 340/438 |
| 6,968,263 B1 * | 11/2005 | Norton | 701/45 |
| 7,102,527 B2 * | 9/2006 | Shieh et al. | 340/602 |
| 7,271,730 B2 * | 9/2007 | Kimura et al. | 340/667 |
| 2004/0249536 A1 * | 12/2004 | Hattori et al. | 701/45 |

FOREIGN PATENT DOCUMENTS

| | | |
|---|---|---|
| EP | 0 990 565 | 9/1998 |
| JP | A-2000-296757 | 10/2000 |

* cited by examiner

*Primary Examiner*—Edward Lefkowitz
*Assistant Examiner*—Octavia Davis
(74) *Attorney, Agent, or Firm*—Posz Law Group, PLC (57) ABSTRACT

A capacitance-type sensor for detecting a condition of an occupant on a vehicle seat includes an electrode. The electrode is disposed within a detection area in the vehicle seat. The electrode generates an electric field. The detection area is based on a surface pressure distribution obtained when an adult sits on the seat.

25 Claims, 10 Drawing Sheets

CAPACITANCE-TYPE SENSOR AND OCCUPANT DETECTION SYSTEM

CROSS REFERENCE TO RELATED APPLICATIONS

This application is based upon and claims the benefit of priority of Japanese Patent Application No. 2004-187742, filed on Jun. 25, 2004, the contents of which are incorporated herein by reference.

FIELD OF THE INVENTION

The present invention relates to a capacitance-type sensor built into a vehicle seat and to an occupant detection system for determining the condition of an occupant on the seat according to the output from the capacitance-type sensor.

BACKGROUND OF THE INVENTION

A typical occupant detection system includes a capacitance-type sensor and an electronic control unit (ECU) used for detecting an occupant. An electrode of the capacitance-type sensor is disposed in a seat to form a high frequency electric field around the electrode. When a human body, which is a dielectric material, approaches the electrode, the high frequency electric field is disturbed. The occupant detection ECU detects this disturbance of the electric field as a variation of the capacitance. That is, the occupant detection ECU determines that an occupant is on the seat from the variation in the capacitance. Such a system is disclosed in Japanese Patent Publication No. 7-78539.

Additionally, Japanese Patent Laid-Open Publication No. Hei 8-225058 discloses an occupant detection system utilizing an electrode built into a seat and a radio frequency (RF) tag built into a child seat. This occupant detection system can distinguish between an adult and a child seat.

The electrode of the capacitance-type sensor described in both of the above-identified patent references, however, is disposed substantially over the entire surface of the seat, so the structure of the capacitance-type sensor is complex. Therefore, the manufacturing cost of the capacitance-type sensor and accordingly that of the occupant detection system are high.

Furthermore, the occupant detection system described in the second patent reference can determine between an adult and a child seat only when an RF tag is built into the child seat, thereby lacking versatility.

SUMMARY OF THE INVENTION

The present invention addresses the above-mentioned and other problems, with an object of providing a capacitance-type sensor and an occupant detection system both having simple structures, low manufacturing costs, and plenty of versatility.

To solve the above-mentioned and other problems, the capacitance-type sensor of the invention detects a condition of an occupant on a vehicle seat on the basis of an electric field generated around an electrode disposed in the seat. The sensor defines a detection area on the basis of a surface pressure distribution obtained when an adult sits in the seat, and has at least one electrode in the detection area.

According to one aspect of the present invention, the capacitance-type sensor of the invention disposes an electrode on the basis of a surface pressure distribution obtained when an adult is seated. The electrode can thereby be disposed in the minimum necessary area of the seat. In other words, it is not necessary for the electrode to be disposed substantially over the entire surface of the seat, so that the area occupied by the electrode can be reduced. Accordingly, the manufacturing costs of the electrode and therefore the capacitance-type sensor can be reduced, and it suffices for the structure of the capacitance-type sensor to be simple.

Further, since the electrode is disposed in the most effective area to determine an occupant on the seat, even though it occupies only a small area, an occupant can certainly be determined.

Furthermore, according to the capacitance-type sensor of the invention, for example, a child seat without a device such as the aforementioned RF tag can certainly be distinguished from an adult. Therefore, the capacitance-type sensor of the invention provides plenty of versatility.

According to another aspect of the present invention, it is preferable that the detection area be set in front of a hip point design point on the seat. The term "hip point" here means a point corresponding to the pivot center of the torso and thigh, described in the three dimensional mannequins for use in defining automobile seating accommodations (3DM-JM50) of Japanese Industrial Standards (JIS) D4607-1977. The term "hip point design point" here means a point defined such that the hip point is dropped and projected to the top surface of a seat.

A large weight tends to be applied to an area extending from the hip point design point to the front direction (in the traveling direction of the vehicle) when an adult is seated. In consideration of this tendency, the present configuration disposes the detection area in front of the hip point design point. According to the configuration, the detection area can be relatively easily set by using the hip point design point as a reference.

According to yet another aspect of the present invention, it is preferable that the detection area be set so as to extend from 0 mm to 200 mm in front of the hip point design point. According to this configuration, the detection area can be relatively easily set by using the hip point design point and the position located at 200 mm in front thereof as references.

The reason why the detection area is set from 0 mm (including 0 mm) in front of the hip point design point is that a large weight is hardly applied to an area extending from 0 mm (not including 0 mm) in back of the hip point design point when an adult is seated. The reason why the detection area is set to up to 200 mm (including 200 mm) in front of the hip point design point is that a large weight is hardly applied to an area extending from 200 mm (not including 200 mm) ahead when an adult is seated.

According to yet another aspect of the present invention, it is preferable that the detection area be substantially symmetrically disposed with respect to a center line of a left and right direction, passing through the hip point design point on the seat. When an adult is seated, it is often the case that the weight is symmetrically applied to the seat. In consideration of this case, according to the present configuration, the detection area is disposed substantially symmetrically with respect to the center line of the left and right direction. According to the configuration, the detection area can be relatively easily set by using the hip point design point as a reference. Further, the accuracy of determining an occupant increases in comparison with the case in which the detection area is disposed only on either the left or right side of the center line of the left and right direction.

According to yet another aspect of the present invention, it is preferable that end positions of the detection area in the left and right direction be set to from 75 mm to 125 mm in both the left and right directions with respect to the hip point design point.

That is, the length of the detection area becomes equal to or greater than 150 mm and equal to or less than 250 mm in the left and right direction. The reason why the end positions of the detection area in the left and right direction are set from 75 mm (including 75 mm) in both the left and right directions with respect to the hip point design point is that if they are less than 75 mm, the length of the detection area in the left and right direction becomes less than 150 mm, resulting in a detection area which is too narrow to obtain a sufficient accuracy of determining an occupant.

The reason why the end positions of the detection area in the left and right direction are set to up to 125 mm (including 125 mm) in both the left and right directions with respect to the hip point design point is that if they exceed 125 mm, the length of the detection area in the left and right direction exceeds 250 mm, resulting in an unacceptably wide detection area.

According to yet another aspect of the present invention, it is preferable that the detection area be defined on the basis of a distance between the electrode and a body of an adult when the adult is seated. The distance between the electrode and a human body depends on the surface pressure applied to the seat when an adult is seated. That is, the smaller the distance between the electrode and human body, the higher the surface pressure applied to the seat. As the distance between the electrode and the human body becomes smaller, the output (for example, capacitance, current, or voltage) from the electrode improves.

In consideration of this dependency, the present configuration defines the detection area on the basis of the distance between the electrode and the human body. According to the configuration, locations receiving a high surface pressure can be relatively easily identified in a surface pressure distribution. Accordingly, the electrode can be disposed in an area from which large output is obtained.

According to yet another aspect of the present invention, it is preferable that the seat have a skin material pressed by an occupant sitting therein, that the electrode be disposed below the skin material, and that the detection area be set in an area receiving a surface pressure equal to or greater than a predetermined surface pressure value according to the surface pressure distribution obtained when the adult is seated, the predetermined surface pressure value being a surface pressure that completes the buckling of the skin material.

Figure 1A:
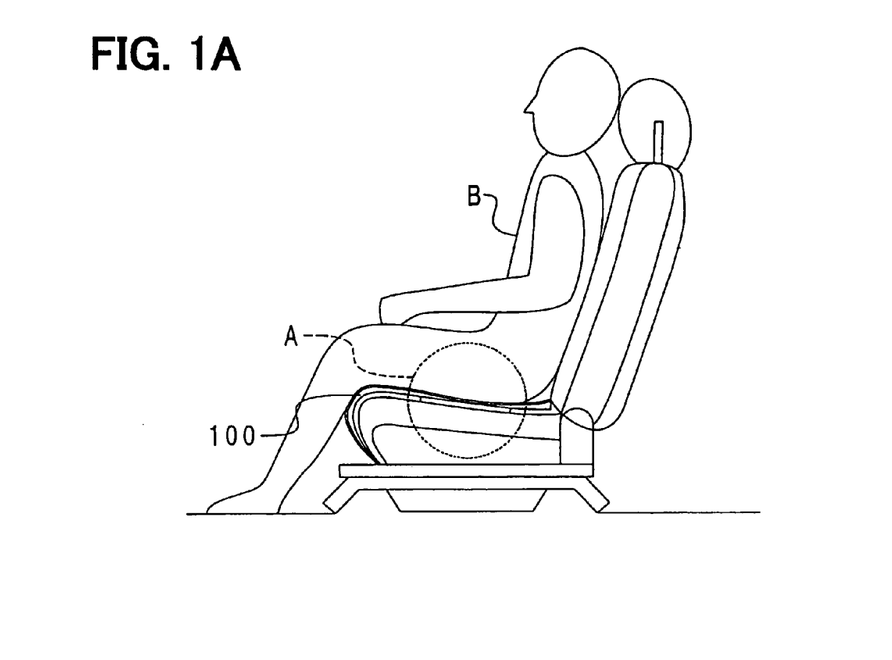
FIG. 1A is a schematic side view of a vehicle seat including a capacitance-type sensor when an adult is seated.
Figure 1B:
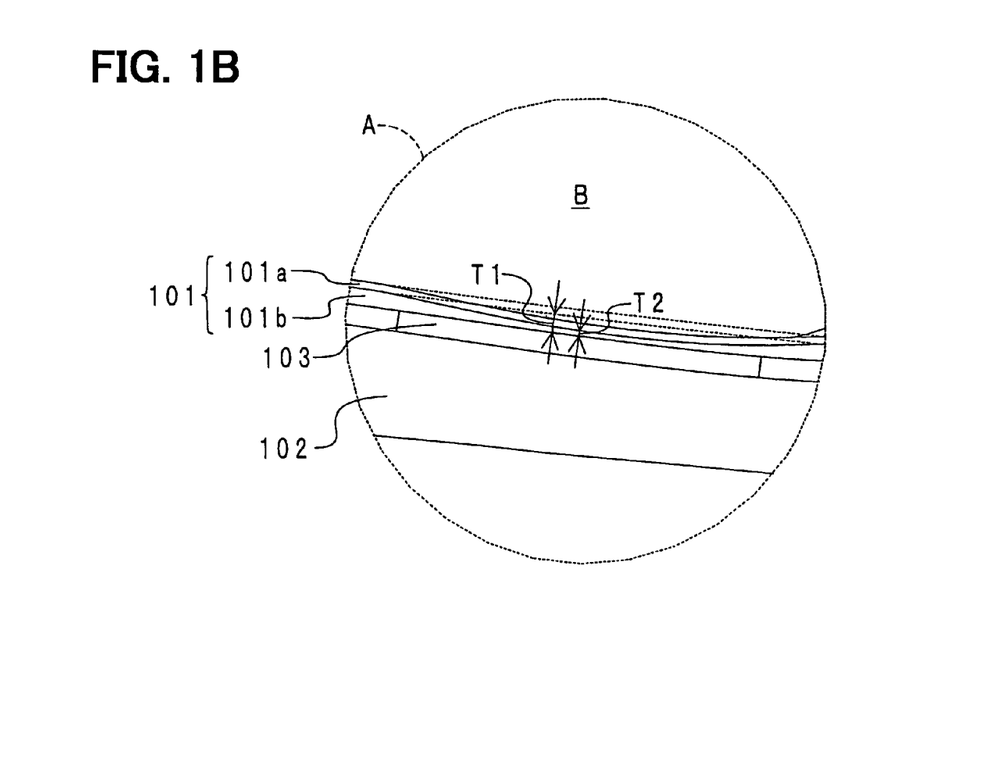
FIG. 1B is an enlarged view of an area within the circle A in FIG. 1A.

By way of example, FIG. 1A illustrates a schematic side view of a seat 100 when an adult human body B is seated. FIG. 1B illustrates an enlarged view of an area within the circle A in FIG. 1A. The seat 100 comprises a skin material 101 and a cushion material 102. The skin material 101 comprises a skin body 101a and a foam material 101b. An electrode 103 is sandwiched between the lower surface of the foam material 101b and the upper surface of the cushion material 102.

When an adult sits in the seat 100, the seat 100 is pressed by the human body B and a surface pressure is applied to the skin material 101. As a result, the foam material 101b is compressed and deformed. Specifically, the thickness of the foam material 101b is changed from T1 to T2.

Figure 2:
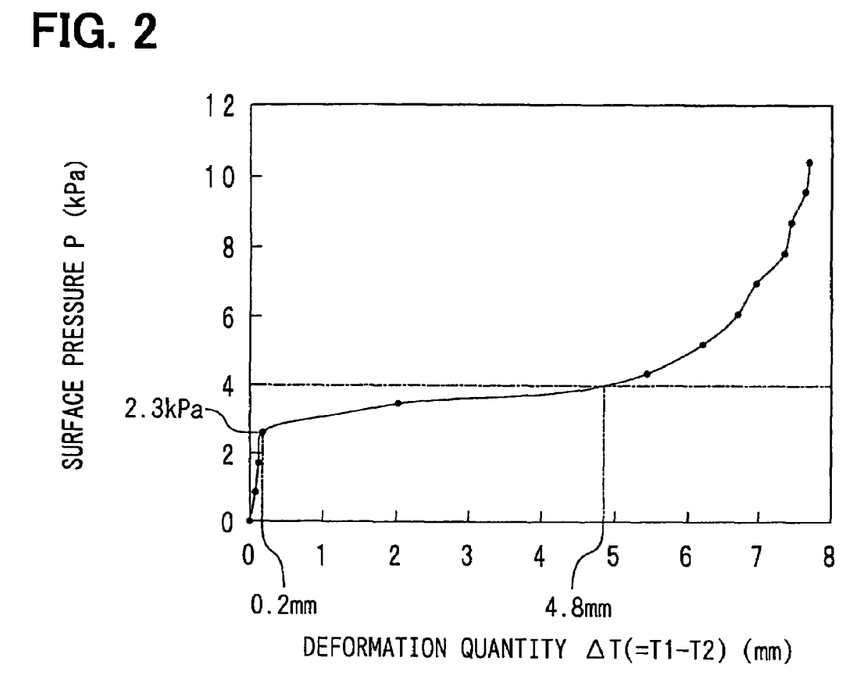
FIG. 2 is a graph showing a relationship between a deformation quantity and a surface pressure applied to a seat.

FIG. 2 illustrates a relationship between a deformation quantity $\Delta T$ and a surface pressure P applied to the seat 100. As shown in FIG. 2, in the range where the deformation quantity $\Delta T$ is less than about 0.2 mm, the slope of the surface pressure P with respect to the deformation quantity $\Delta T$ is large. In contrast, in the range where the deformation quantity $\Delta T$ is about 0.2 mm or more and about 4.8 mm or less, the slope of the surface pressure P with respect to the deformation quantity $\Delta T$ is small. Therefore, in this range, a slight increase of from about 2.3 kPa to about 4.0 kPa in the surface pressure P causes the skin material 101 to be compressed and deformed by about 4.6 mm (about 4.8 mm-about 0.2 mm). Such a phenomenon that when a skin material is compressed and deformed, the slope of a surface pressure (or weight) with respect to a deformation quantity becomes extremely small is referred to as "buckling" in this specification.

In the range where the deformation quantity $\Delta T$ is about 4.8 mm or more, the slope of the surface pressure P with respect to the deformation quantity $\Delta T$ becomes large again. In other words, in this example, the buckling of the skin material is completed at a surface pressure value of 4 kPa, which indicates that "predetermined surface pressure value" is 4 kPa in this example.

The output from the electrode 103 depends on the distance between the human body B and the electrode 103. Specifically, the smaller the distance between the human body B and the electrode 103 or the larger the deformation quantity $\Delta T$ of the skin material 101, the larger the output will become. That is, an amount of the output is proportional to the deformation quantity $\Delta T$.

In consideration of this relationship, the present configuration defines the detection area on the basis of a predetermined surface pressure value (in this example, P=4 kPa) which becomes a measure of the completion of buckling. In the configuration, according to a surface pressure distribution obtained when an adult is seated, the detection area is set in an area receiving a surface pressure equal to or greater than the predetermined surface pressure value that completes the buckling of the skin material. Therefore, since the distance between the human body B and the electrode 103 becomes smaller when an adult is seated, a large output can be obtained, thereby improving the accuracy of determining an occupant.

According to yet another aspect of the present invention, it is preferable that the detection area be defined on the basis of a common area between: an area receiving a surface pressure equal to or greater than the predetermined surface pressure value according to the surface pressure distribution obtained when the adult sits normally in the seat; and an area receiving a surface pressure equal to or greater than the predetermined surface pressure value according to the surface pressure distribution obtained when the adult sits forward in the seat.

When an occupant sits in the seat, there is no guarantee that the occupant always sits in the same position on the seat. Therefore, when the detection area is defined, it is preferable to assume the case when an occupant sits forward in the seat in addition to the case when the occupant sits normally in the seat, which corresponds to the sitting posture during the crash test, defined in the US regulation of federal motor vehicle safety standard (FMVSS) 208, or to the sitting posture when sitting back in the seat.

In consideration of determining, for example, between an adult and a child seat, between an adult and a vacant seat, and between an adult and a child, an adult with a small body frame is preferably used to define the detection area. This is because if it is possible, for example, to determine between an adult with a small body frame and a child seat, it is facilitated to determine between an adult with a normal body frame and a child seat.

Figure 3A:
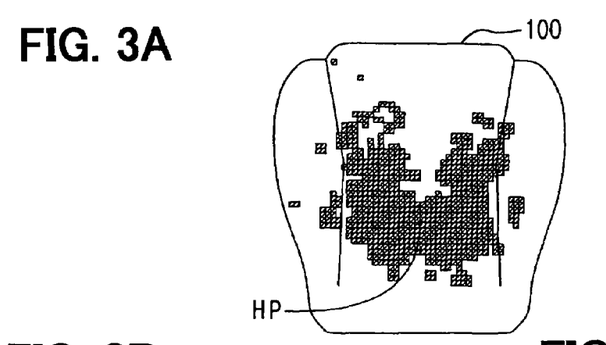
FIG. 3A is a surface pressure distribution obtained when an adult with a small body frame is seated normally in the seat.
Figure 3B:
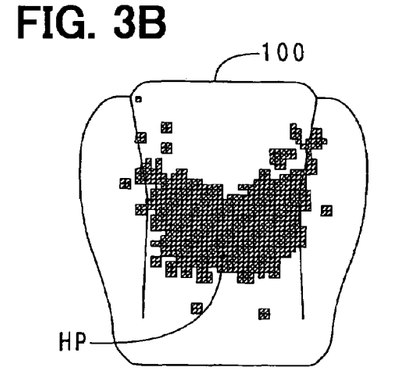
FIG. 3B is a surface pressure distribution obtained when the buttocks are positioned 50 mm forward with respect to the normal sitting on the seat.
Figure 3C:
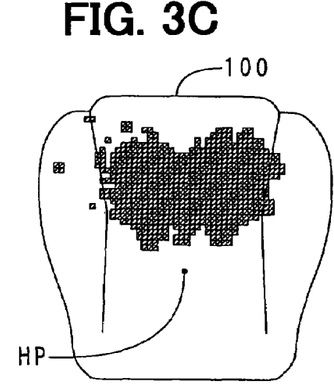
FIG. 3C is a surface pressure distribution obtained when the buttocks are positioned 150 mm forward with respect to the normal sitting on the seat.

In consideration of the above two points, the inventors of the present invention studied a surface pressure applied to a seat when an adult with a small body frame (corresponding to an adult female who is at the 5 percentile defined in the US regulation of FMVSS 208 and has a weight of 46.7 kg to 51.25 kg and a height of 139.7 cm to 150 cm) is seated. The results are shown in FIGS. 3A to 3C: FIG. 3A is a surface pressure distribution obtained when an adult with a small body frame sits normally; FIG. 3B is a surface pressure distribution obtained when the buttocks are positioned 50 mm forward with respect to the normal sitting; and FIG. 3C is a surface pressure distribution obtained when the buttocks are positioned 150 mm forward with respect to the normal sitting. In FIGS. 3A to 3C, grids with hatchings indicate parts receiving a surface pressure of 4 kPa or more (conveniently referred to below as "high-pressure parts"). The surface pressure of 4 kPa, however, is only an example of the predetermined surface pressure value, so the predetermined surface pressure value of the present configuration is not limited to 4 kPa.

Figure 4:
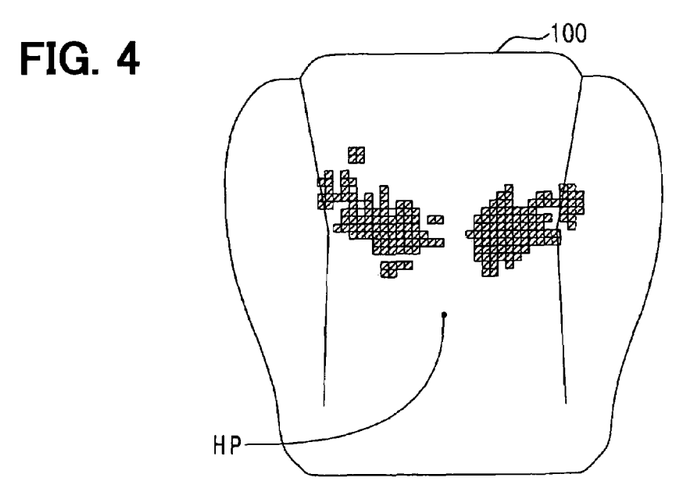
FIG. 4 shows a common area obtained from FIGS. 3A to 3C.

As shown in FIGS. 3A to 3C, the high-pressure parts shift forward from the hip point design point HP when an occupant sits forward in the seat 100 (FIG. 3B, FIG. 3C). That is, the high-pressure parts correspond to the position of the buttocks of an occupant. Regardless how an occupant is seated, however, the surface pressure distributions always include the high-pressure parts. If overlapped positions are extracted from the high-pressure parts in FIGS. 3A to 3C, the common area shown in FIG. 4 is obtained, in which like parts in FIGS. 3A to 3C are indicated by like reference characters. The high-pressure parts shown in FIG. 4 always occur regardless of how an adult with a small body frame is seated.

The detection area of the present configuration is defined on the basis of this common area. According to the configuration, regardless of the body frame of an adult and a sitting position of an adult, an occupant can be determined with a stable accuracy. Further, since the detection area is defined on the basis of the common area, the size of the detection area and accordingly the area in which the electrode is disposed can be made smaller.

According to yet another aspect of the present invention, it is preferable that the predetermined surface pressure value be set to 4 kPa, which is obtained from the measured result in FIG. 2.

According to yet another aspect of the present invention, it is preferable that the electrode be disposed in a plural number and the plurality of electrodes be connected to the same voltage level. According to the present configuration, the detection area can be narrowed down to dispose the electrodes. Further, when the electrode 103 is sandwiched between the cushion material 102 and the skin material 101 of the seat 100 (refer to FIG. 1), the plurality of electrodes can be disposed while avoiding the position where a suspension groove is formed on the surface of the cushion material 102.

According to yet another aspect of the present invention, it is preferable that the plurality of electrodes be disposed in parallel with each other in the left and right direction in the detection area. According to the present configuration, the electrodes can be disposed while avoiding the position where a suspension groove extending in the front and rear direction is formed on the seat.

According to yet another aspect of the present invention, it is preferable that the plurality of electrodes be disposed in parallel with each other in the front and rear direction in the detection area. According to the present configuration, the electrodes can be disposed while avoiding the position where a suspension groove extending in the left and right direction is formed on the seat. Further, this configuration may be used by combining with the above-described configuration, which results in the plurality of electrodes disposed both in the front and rear direction and in the left and right direction in the detection area.

According to yet another aspect of the present invention, it is preferable that the electrode be disposed in a plural number and the plurality of electrodes be able to provide individual outputs. The present configuration can detect weight shift on the seat, which will occur, for example, when a vehicle is accelerated, decelerated, or turned.

According to yet another aspect of the present invention, it is preferable that the plurality of electrodes be disposed in parallel with each other in the left and right direction in the detection area. The present configuration can detect weight shift, especially in the left and right direction.

According to yet another aspect of the present invention, it is preferable that the plurality of electrodes be disposed in parallel with each other in the front and rear direction in the detection area. The present configuration can detect weight shift, especially in the front and rear direction. Further, this configuration may be used by combining with the above configuration (14), which results in the plurality of electrodes disposed both in the front and rear direction and in the left and right direction in the detection area.

According to yet another aspect of the present invention, it is preferable that the sensor further includes: an upper layer film that covers the top of the electrode; and a lower layer film that covers the bottom of the electrode and seals the electrode between itself and the upper layer film, wherein a permittivity of the upper layer film is set to be higher than that of the lower layer film.

As the area occupied by an electrode becomes smaller, the sensitivity of detecting the output from the electrode is degraded. According to the present configuration, however, since the upper layer film has a higher permittivity, the degradation of the output detection sensitivity can be prevented.

According to yet another aspect of the present invention, it is preferable that the sensor further include an upper layer film that covers the top of the electrode, a lower layer film that covers the bottom of the electrode and seals the electrode between itself and the upper layer film, and a conductive member that is interposed between the upper and lower layer films and disposed above the electrode, wherein a permittivity of the conductive member is set to be higher than those of the upper and lower layer films. According to the present configuration the degradation of the sensitivity of detecting the output from the electrode can be prevented.

According to yet another aspect of the present invention, it is preferable, in the above configuration (17), that the conductive member have a larger area than the electrode. According to the present configuration, the degradation of the output detection sensitivity can be further prevented.

Accordingly, an occupant detection system of another aspect of the invention includes: a capacitance-type sensor which defines a detection area on the basis of a surface pressure distribution in a seat obtained when an adult is seated, the sensor having a plurality of electrodes disposed in the detection area; and an occupant detection ECU which determines an occupant according to outputs from the plurality of electrodes, wherein when a previous decision result is "adult," the occupant detection ECU maintains this decision result on the condition that: an entire output total value is less than an entire output threshold value, the entire output total value being the total sum of the outputs from the electrodes disposed in all of the detection area; and a partial output total value is less than a partial output threshold value, the partial output total value being the total sum of the outputs from the electrodes disposed in a part of the detection area, or another partial output total value is less than another partial output threshold value, the another partial output total value being the total sum of the outputs from the electrodes disposed in another part of the detection area.

The capacitance-type sensor used in the occupant detection system of the invention comprises a plurality of electrodes that can provide individual outputs. According to the occupant detection system of the invention, even if an entire output total value is less than an entire output threshold value (for example, a threshold value for determining between an adult and a child seat), if a partial output total value is less than a partial output threshold value or another partial output total value is less than another partial output threshold value, the decision result is maintained to be "adult." In other words, the decision result is changed only if the partial output total value is less than the partial output threshold value and the another partial output total value is less than the another partial output threshold value, or the partial output total value is equal to or greater than the partial output threshold value and the another partial output total value is equal to or greater than the another partial output threshold value. According to the present configuration, an occupant can be determined considering the posture and weight shift of the occupant during driving. Therefore, the degradation of the accuracy of determining an occupant, caused by the posture and weight shift of the occupant, can be prevented.

According to yet another aspect of the present invention, it is preferable that the part of the detection area be set to a right half of the detection area and that the another part of the detection area be set to a left half of the detection area. According to the present configuration, the degradation of the accuracy of determining an occupant, caused by the weight shift especially in the left and right direction, can be prevented. That is, the degradation of the accuracy of determining an occupant, which will occur, for example, when a vehicle is turned, can be prevented.

According to yet another aspect of the present invention, it is preferable that the part of the detection area be set to a front half of the detection area and that the another part of the detection area be set to a rear half of the detection area. According to the present configuration, the degradation of the accuracy of determining an occupant, caused by the weight shift especially in the front and rear direction, can be prevented. That is, the degradation of the accuracy of determining an occupant, which will occur, for example, when a vehicle is accelerated or decelerated, can be prevented.

Accordingly, an occupant detection system of another aspect of the invention includes: a capacitance-type sensor which defines a detection area on the basis of a surface pressure distribution in a seat obtained when an adult is seated, the sensor having a plurality of electrodes disposed in the detection area; and an occupant detection ECU that determines an occupant according to outputs from the plurality of electrodes, wherein when a previous decision result is "adult", the occupant detection ECU maintains this decision result on the condition that: an entire output total value, which is the total sum of the outputs from the electrodes disposed in all of the detection area, is less than an entire output threshold value; and an absolute value of a difference between a partial output total value which is the total sum of the outputs from the electrodes disposed in a part of the detection area, and another partial output total value which is the total sum of the outputs from the electrodes disposed in another part of the detection area, exceeds a difference threshold value.

The capacitance-type sensor used in the occupant detection system of the invention comprises a plurality of electrodes that can provide individual outputs. According to the occupant detection system of the invention, even if an entire output total value is less than an entire output threshold value (for example, a threshold value for determining between an adult and a child seat), if the absolute value of the difference between a partial output total value and another partial output total value exceeds a difference threshold value, the decision result is maintained to be "adult." In other words, the decision result is changed only if the absolute value of the difference is equal to or less than the difference threshold value. According to the present configuration, an occupant can be determined considering the posture and weight shift of the occupant during driving. Therefore, the degradation of the accuracy of determining an occupant, caused by the posture and weight shift of the occupant, can be prevented.

According to yet another aspect of the present invention, it is preferable that the part of the detection area be set to a right half of the detection area and that the another part of the detection area be set to a left half of the detection area. According to the present configuration, the degradation of the accuracy of determining an occupant, caused by the weight shift especially in the left and right direction, can be prevented. That is, the degradation of the accuracy of determining an occupant, which will occur, for example, when a vehicle is turned, can be prevented.

According to yet another aspect of the present invention, it is preferable that the part of the detection area be set to the front half of the detection area and that the another part of the detection area be set to the rear half of the detection area. According to the present configuration, the degradation of the accuracy of determining an occupant, caused by the weight shift especially in the front and rear direction, can be prevented. That is, the degradation of the accuracy of determining an occupant, which will occur, for example, when a vehicle is accelerated or decelerated, can be prevented.

The present invention can provide a capacitance-type sensor and an occupant detection system both having simple structures, low manufacturing costs, and plenty of versatility.

Other features and advantages of the present invention will be appreciated, as well as methods of operation and the function of the related parts from a study of the following detailed description, appended claims, and drawings, all of which form a part of this application. In the drawings:

DETAILED DESCRIPTION OF THE PRESENT INVENTION

The capacitance-type sensor and occupant detection system of the present invention will now be described with reference to the accompanying drawings.

Figure 5A:
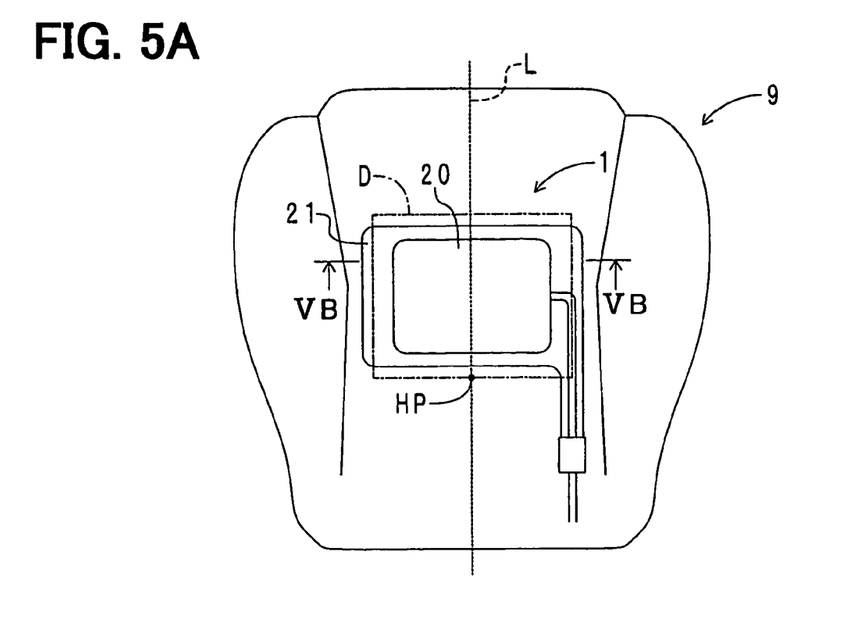
FIG. 5A is a transparent top view of a seat in which the capacitance-type sensor of a first embodiment of the present invention is disposed.
Figure 5B:
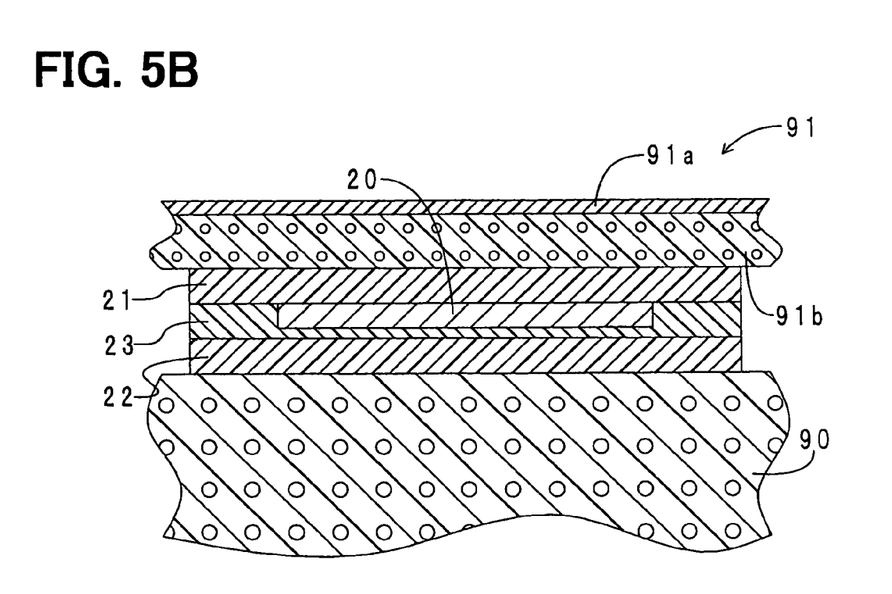
FIG. 5B is a cross-sectional view taken along the line VB-VB in FIG. 5A.

First, the structure of the capacitance-type sensor of the invention will be described. FIG. 5A is a transparent top view of a seat in which the capacitance-type sensor of the invention is disposed. FIG. 5B is a cross-sectional view taken along the line I-I in FIG. 5A. In FIG. 5B, for convenience of description, the size of the capacitance-type sensor is exaggerated in the up and down direction.

As shown in these drawings, the capacitance-type sensor 1 is interposed between the top surface of a cushion material 90 and the bottom surface of a skin material 91 of the seat (front seat) 9. The capacitance-type sensor 1 comprises an electrode 20, an upper layer film 21, a lower layer film 22, and an adhesive 23.

The lower layer film 22 is a rectangular film made of polyethylene terephthalate (PET), and is disposed on the top surface of the cushion material 90. The electrode 20 is also a rectangular film comprising a carbon electrode and a silver electrode (both not shown), and is disposed on the bottom surface of the upper layer film 21.

The electrode 20 is also disposed in a rectangular detection area D shown by a dashed line in FIG. 5A. The detection area D has a length of 200 mm in the front and rear direction and a length of 250 mm in the left and right direction. A hip point design point HP is disposed at the center of the rear line of the detection area D. The detection area D is set so as to be symmetrical with respect to the center line L of the left and right direction, which passes through the hip point design point HP as shown by a dotted line in FIG. 5A.

The upper layer film 21 is a rectangular film made of PET, and is disposed above the electrode 20. The upper layer film 21 and the lower layer film 22 are attached to each other through the adhesive 23. The skin material 91 is disposed above the upper layer film 21, and is formed with a skin body 91a and a foam material 91b.

Figure 6:
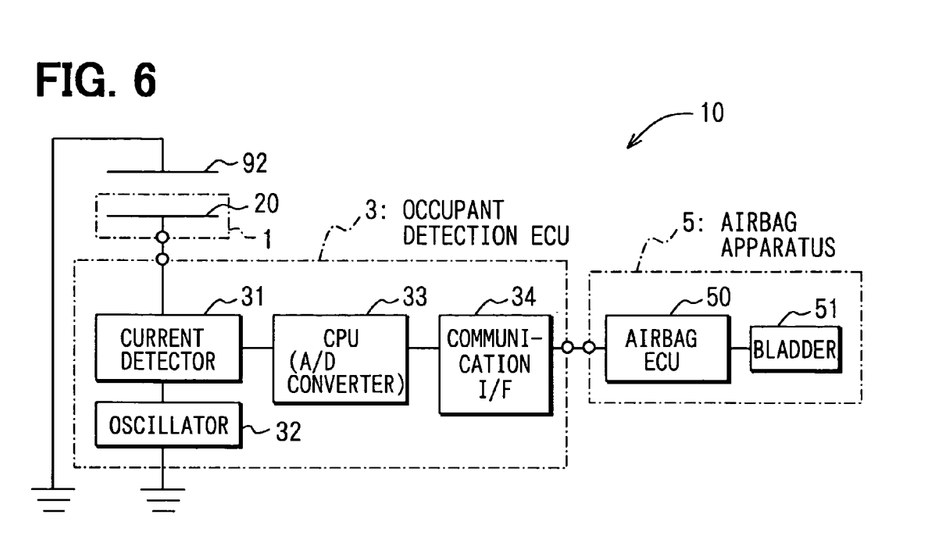
FIG. 6 is a block diagram of the occupant detection system according to the first embodiment of the present invention.

Next, the configuration of the occupant detection system according to the present embodiment will be described. FIG. 6 is a block diagram of the occupant detection system according to the first embodiment. As shown in FIG. 6, the occupant detection system 10 of the embodiment comprises a capacitance-type sensor 1 and an occupant detection ECU 3.

The occupant detection ECU 3 comprises a current detector 31, an oscillator 32, a central processing unit (CPU) 33, and a communication interface (I/F) 34. Both the current detector 31 and the oscillator 32 are connected to the electrode 20. The oscillator 32 generates a high-frequency low voltage. The current detector 31 detects a current supplied to the electrode 20.

The CPU 33 is connected to the current detector 31, the output current of which is converted to a digital value by an analog-to-digital (A/D) converter in the CPU 33. The CPU 33 identifies an occupant on the basis of the converted digital value of the output current. The result of the determination is transmitted to an air bag ECU 50 in an air bag apparatus 5 via the communication I/F 34. The air bag ECU 50 determines whether to allow a bladder 51 to be inflated or not.

Next, the operation of the occupant detection system of the embodiment will be described. A voltage applied from the oscillator 32 creates an electric field between the electrode 20 and a seat frame 92 (steel frame forming the skeleton of the seat 9). When a child seat (not shown) is mounted on the seat 9, the child seat intervenes in the capacitor formed by the electrode 20 and the seat frame 92. The current detector 31 detects a current supplied to the electrode 20. The output current of the current detector 31 is converted to a digital value by the A/D converter in the CPU 33. The CPU 33 compares the converted digital value of the output current with a prestored occupant determination threshold value (a threshold value for determining between an adult and a child seat). When a child seat is mounted on the seat 9, the digital value of the output current becomes less than the occupant determination threshold value. This information is transmitted to the air bag ECU 50 via the communication I/F 34. The air bag ECU 50 then places the bladder 51 in the state it is inhibited from being inflated.

In contrast, when an adult sits in the seat 9, a human body intervenes in the capacitor formed by the electrode 20 and the seat frame 92. Since the permittivity of a human body (about 50) is greater than that of a child seat (about 3 to 5, although depending on the material), the current detector 31 outputs larger current when an adult is seated than when a child seat is mounted. The CPU 33 compares the converted digital value of the output current with the occupant determination threshold value. When an adult is seated, the digital value of the output current becomes equal to or greater than the occupant determination threshold value. This information is transmitted to the air bag ECU 50 via the communication I/F 34. The air bag ECU 50 then places the bladder 51 in the state it is allowed to be inflated.

Next, the operational effects of the capacitance-type sensor and occupant detection system according to the embodiment will be described. The detection area D of the capacitance-type sensor 1 of the first embodiment is determined on the basis of a surface pressure distribution obtained when an adult is seated. Specifically, the detection area D is determined according to the analyses shown in FIGS. 3A to 3C and FIG. 4. Therefore, the electrode 20 can be disposed in the minimum necessary amount of area of the seat 9. In other words, it is not necessary for the electrode 20 to be disposed substantially over the entire surface of the seat 9, so that the area occupied by the electrode 20 can be reduced. Accordingly, the manufacturing costs of the electrode 20 and therefore the capacitance-type sensor 1 can be reduced. It also suffices for the structure of the capacitance-type sensor 1 to be simple.

Further, the electrode 20 is disposed in the most effective area to determine an occupant on the seat 9. Therefore, even though the electrode 20 occupies only a small area, identifying an occupant can certainly be carried out.

Furthermore, even if a child seat without a device such the aforementioned RF tag is mounted on the seat 9, distinguishing between the child seat and an adult can certainly be carried out. Therefore, the capacitance-type sensor 1 and the occupant detection system 10 of the embodiment provide plenty of versatility.

Still furthermore, the detection area D is disposed so as to extend from 0 mm to 200 mm in front of the hip point design point HP. Therefore, the detection area D can be relatively easily set with reference to the hip point design point HP. The detection area D can also cover all area in the front and rear direction, to which large weight is applied when an adult is seated.

Still furthermore, the end positions of the detection area D in the left and right direction are set to 125 mm in both left and right directions with reference to the hip point design point HP. That is, the length of the detection area D in the left and right direction is set to 250 mm. Therefore, the detection area D can be relatively easily set with reference to the hip point design point HP. The detection area D can also cover all area in the left and right direction, to which large weight is applied when an adult is seated.

Still furthermore, as shown in FIGS. 3A to 3C and FIG. 4, the detection area D of the embodiment is set to the area receiving a surface pressure equal to or greater than a predetermined surface pressure value (4 kPa) that completes the buckling of the foam material 91b when an adult is seated. Therefore, the distance between the human body B and the electrode 103 becomes smaller when an adult is seated (refer to FIG. 1), so the output current becomes larger, thereby improving the accuracy of determining an occupant.

Still furthermore, the detection area D of the embodiment is defined on the basis of a common area between: an area receiving a surface pressure equal to or greater than the predetermined surface pressure value according to a surface pressure distribution obtained when an adult with a small body frame sits normally in the seat 9 (FIG. 3A); and an area receiving a surface pressure equal to or greater than the predetermined surface pressure value according to surface pressure distributions obtained when the adult with the small body frame sits forward in the seat 9 (FIGS. 3B and 3C). Therefore, identifying of an occupant can be carried out with a stable accuracy, regardless of a body frame and a sitting position of the adult who is seated. Since the detection area D is defined on the basis of the common area, the size of the detection area D and therefore the area in which the electrode 20 is disposed can also be reduced.

Still furthermore, since the electrode 20 of the capacitance-type sensor 1 of the first embodiment is sealed in advance by the upper layer film 21 and the lower layer film 22, installing of the electrode 20 in the seat 9 is facilitated.

A second embodiment differs from the first embodiment in that two electrodes are disposed in parallel with each other in the front and rear direction. Accordingly, only the different point will be described here.

Figure 7:
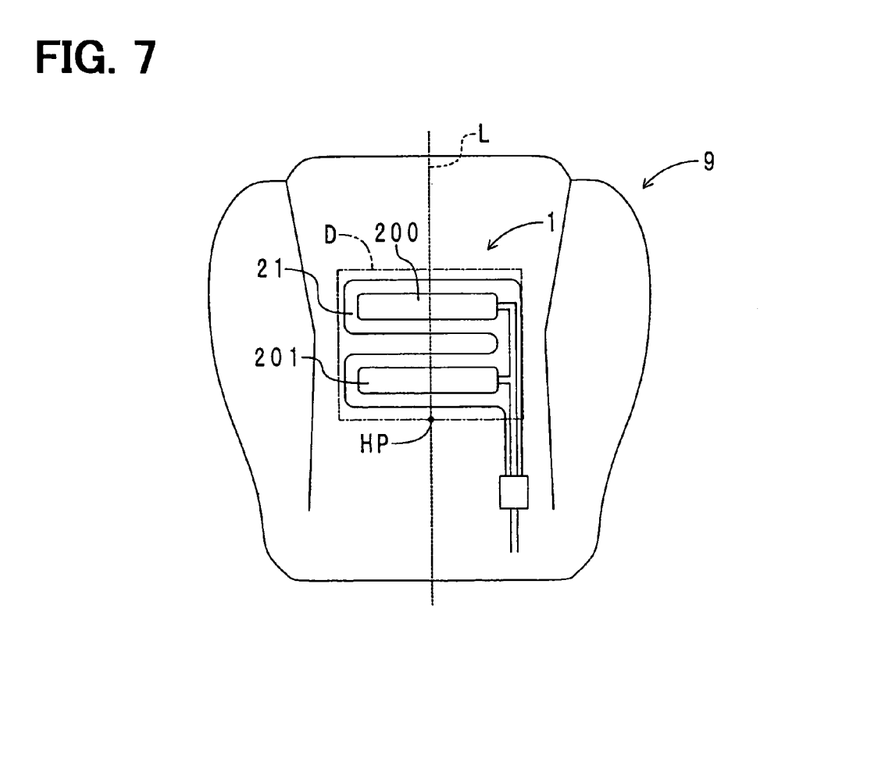
FIG. 7 is a transparent top view of a seat in which the capacitance-type sensor of a second embodiment of the present invention is disposed.

FIG. 7 is a transparent top view of a seat in which the capacitance-type sensor of the present embodiment is disposed, where like parts in FIG. 5A are indicated by like reference characters. As shown in FIG. 7, front and rear electrodes 200 and 201, both of which are rectangular films, are disposed in parallel with each other in the detection area D. The front and rear electrodes 200 and 201 are connected in parallel to the same voltage level.

The capacitance-type sensor 1 of the second embodiment has the same operational effects as the capacitance-type sensor of the first embodiment. According to the capacitance-type sensor 1 of the second embodiment, the front and rear electrodes 200 and 201 can be disposed while avoiding the position where a suspension groove is formed in the left and right direction on the surface of the cushion material of the seat 9. Further, according to the capacitance-type sensor 1 of the second embodiment, detection points in the detection area D can be narrowed down to dispose the front and rear electrodes 200 and 201.

A third embodiment differs from the first embodiment in that two electrodes are disposed in parallel with each other in the left and right direction. Accordingly, only the different point will be described here.

Figure 8:
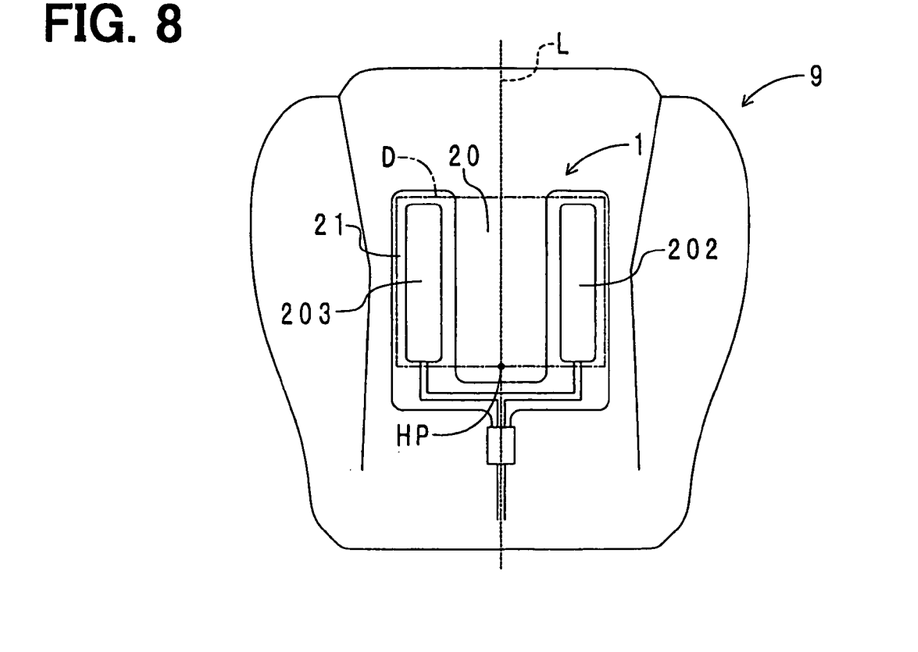
FIG. 8 is a transparent top view of a seat in which the capacitance-type sensor of a third embodiment of the present invention is disposed.

FIG. 8 is a transparent top view of a seat in which the capacitance-type sensor of the present embodiment is disposed, where like parts in FIG. 5A are indicated by like reference characters. As shown in FIG. 8, right and left electrodes 202 and 203, both of which are rectangular films, are disposed in parallel with each other in the detection area D. The right and left electrodes 202 and 203 are connected in parallel to the same voltage level.

The capacitance-type sensor 1 of the third embodiment has the same operational effects as the capacitance-type sensor of the first embodiment. According to the capacitance-type sensor 1 of the third embodiment, the right and left electrodes 202 and 203 can be disposed while avoiding the position where a suspension groove is formed in the front and rear direction on the surface of the cushion material of the seat 9. Further, according to the capacitance-type sensor 1, detection points in the detection area D can be narrowed down to dispose the right and left electrodes 202 and 203.

A fourth embodiment differs from the third embodiment in that the right and left electrodes are both divided into two parts in the front and rear direction. That is, in the fourth embodiment, four electrodes are disposed both in the front and rear direction and in the left and right direction. Accordingly, only the different point will be described here.

Figure 9:
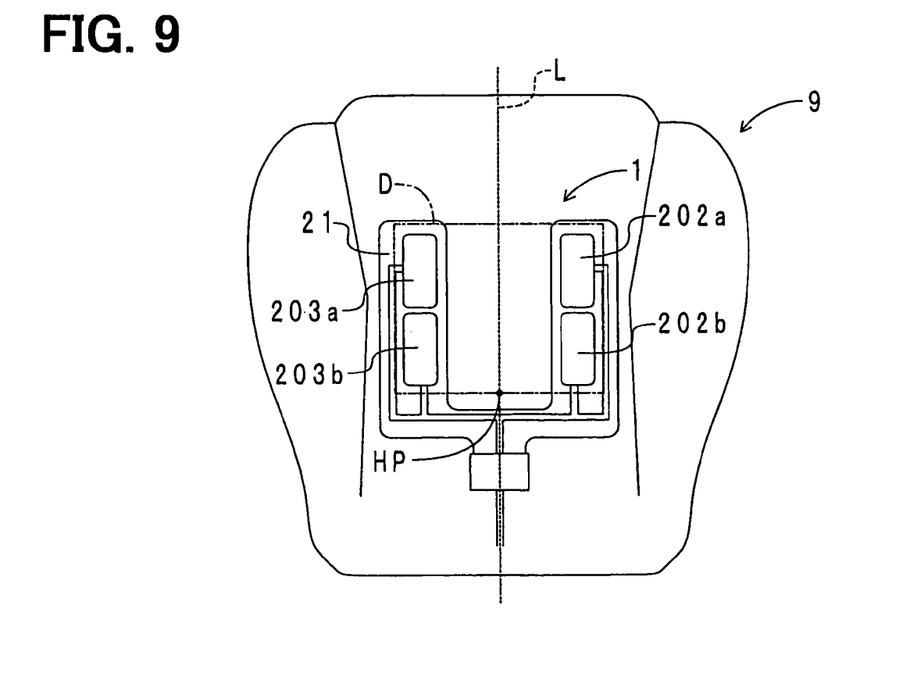
FIG. 9 is a transparent top view of a seat in which the capacitance-type sensor of a fourth embodiment of the present invention is disposed.

FIG. 9 is a transparent top view illustrating a seat in which the capacitance-type sensor of the fourth embodiment is disposed, where like parts in FIG. 8 are indicated by like reference characters. As shown in FIG. 9, right front, right rear, left front, and left rear electrodes 202a, 202b, 203a, and 203b, all of which are rectangular films, are disposed in the detection area D. These four electrodes are connected in parallel to the same voltage level.

The capacitance-type sensor 1 of the fourth embodiment has the same operational effects as the capacitance-type sensor of the third embodiment. According to the capacitance-type sensor 1 of the embodiment, the right front, right rear, left front, and left rear electrodes 202a, 202b, 203a, and 203b can be disposed while avoiding the position where suspension grooves are formed in the front and rear direction and in the front and rear direction on the surface of the cushion material of the seat 9. Further, according to the capacitance-type sensor 1 of the embodiment, detection points in the detection area D can be narrowed down to dispose the right front, right rear, left front, and left rear electrodes 202a, 202b, 203a, and 203b.

A fifth embodiment differs from the second embodiment in that the outputs from the respective electrodes can be detected separately. Accordingly, only the different point will be described here.

Figure 10:
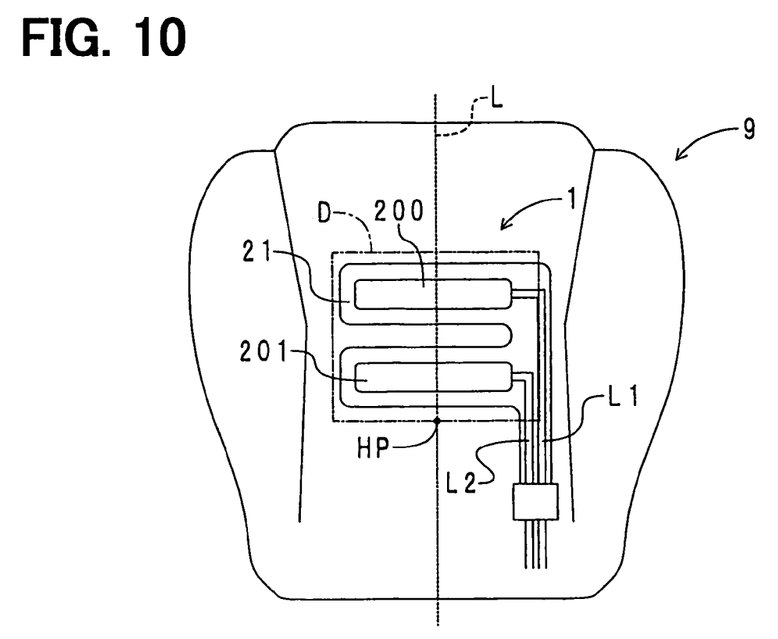
FIG. 10 is a transparent top view of a seat in which the capacitance-type sensor of a fifth embodiment of the present invention is disposed.

FIG. 10 is a transparent top view illustrating a seat in which the capacitance-type sensor of the fifth embodiment is disposed, where like parts in FIG. 7 are indicated by like reference characters. As shown in FIG. 10, a conductor L1 that electrically connects the front electrode 200 to an occupant detection ECU (not shown) is separated from a conductor L2 that electrically connects the rear electrode 201 to the occupant detection ECU. The outputs from the front and rear electrodes 200 and 201 can thereby be transmitted individually to the occupant detection ECU.

The capacitance-type sensor 1 of the embodiment has the same operational effects as the capacitance-type sensor of the second embodiment. Further, the capacitance-type sensor 1 of the embodiment can detect the weight shift of an occupant in the front and rear direction.

A sixth embodiment differs from the third embodiment in that the outputs from the respective electrodes can be detected separately and are used individually to determine an occupant. Accordingly, only the different points will be described here.

Figure 11:
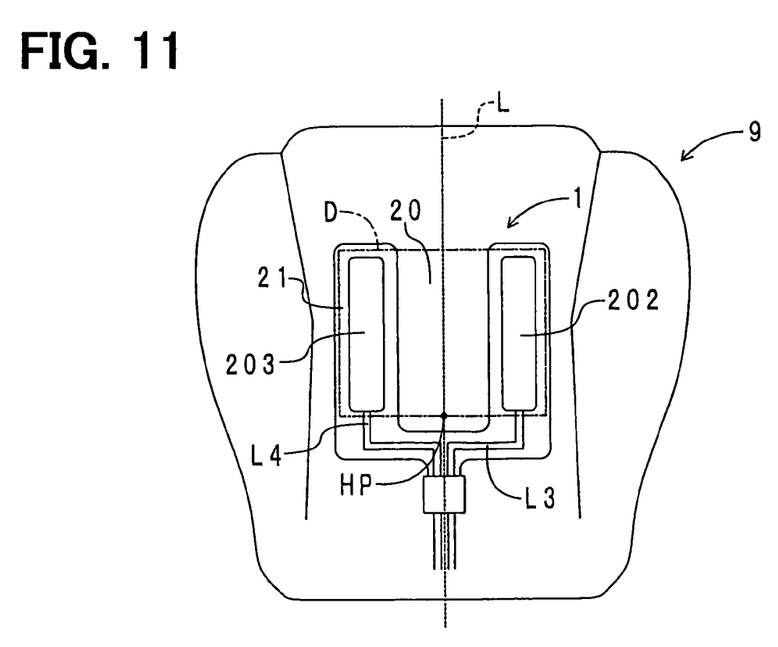
FIG. 11 is a transparent top view of a seat in which the capacitance-type sensor of a sixth embodiment of the present invention is disposed.

FIG. 11 is a transparent top view illustrating a seat in which the capacitance-type sensor of the sixth embodiment is disposed, where like parts in FIG. 8 are indicated by like reference characters. As shown in FIG. 11, a conductor L3 that electrically connects the right electrode 202 to an occupant detection ECU (not shown) is separated from a conductor L4 that electrically connects the left electrode 203 to the occupant detection ECU. The outputs from the right and left electrodes 202 and 203 can thereby be transmitted individually to the occupant detection ECU.

Figure 12:
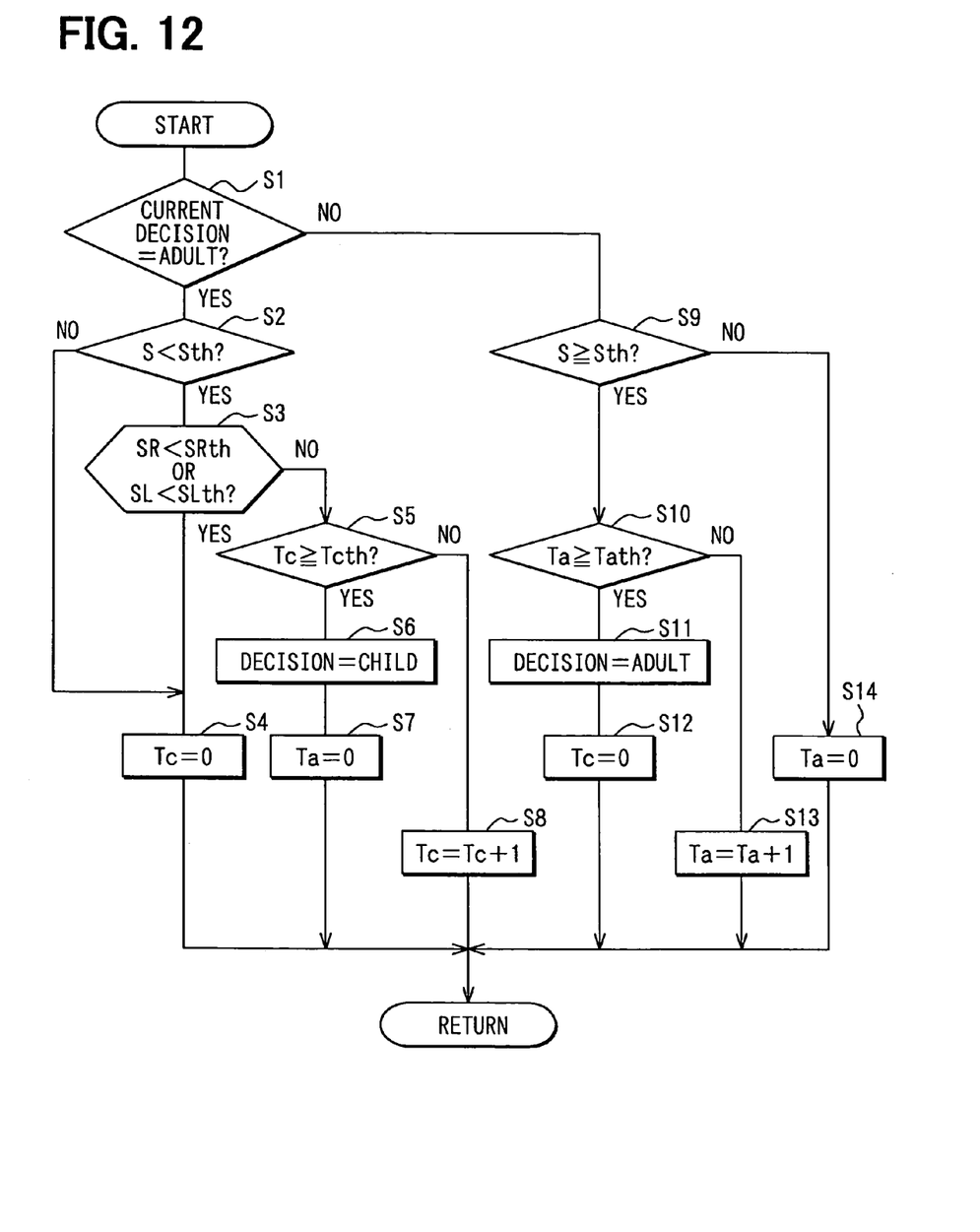
FIG. 12 is a flowchart of an occupant determination process performed by an occupant detection ECU of the occupant detection system of the sixth embodiment of the present invention.

FIG. 12 is a flowchart of the occupant determination process performed by the occupant detection ECU in the occupant detection system of the sixth embodiment. If the current decision result is "adult" at (S1), a converted digital value S of the output current is compared with an occupant determination threshold value (a threshold value for determining between an adult and a child seat) Sth at (S2).

The digital value S of the output current is the total sum of a digital value SR of the output current from the right electrode 202 and a digital value SL of the output current from the left electrode 203, which corresponds to the entire output total value of the invention. The occupant determination threshold value Sth corresponds to the entire output threshold value of the invention. The digital value SR of the output current corresponds to a first partial output total value of the invention. The digital value SL of the output current corresponds to a second partial output total value of the invention.

As a result of the comparison, if the digital value S of the output current is equal to or greater than the occupant determination threshold value Sth, a counter Tc for a child seat is set to zero (Tc=0) at (S4) and the procedure is repeated. If the digital value S of the output current is less than the occupant determination threshold value Sth, the digital value SR of the output current is compared with a right output threshold value SRth at (S3). In addition, the digital value SL of the output current is compared with a left output threshold value SLth at (S3). The right output threshold value SRth corresponds to a first partial output threshold value of the invention, and the left output threshold value SLth to a second partial output threshold value of the invention.

As a result of this comparison, if the digital value SR of the output current is less than the right output threshold value SRth or the digital value SL of the output current is less than the left output threshold value SLth, the counter Tc for a child seat is set to zero (Tc=0) at (S4) and the procedure is repeated. If the digital value SR of the output current is less than the right output threshold value SRth and the digital value SL of the output current is less than the left output threshold value SLth, or if the digital value SR of the output current is equal to or greater than the right output threshold value SRth and the digital value SL of the output current is equal to or greater than the left output threshold value SLth, a value of the counter Tc for a child seat is compared with a time limit Tcth for a child seat at (S5).

As a result of this comparison, if the value of the counter Tc is less than the time limit Tcth, the counter Tc is increased by one at (S8) and the procedure is repeated. If the value of the counter Tc is equal to or greater than the time limit Tcth, it is decided that the occupant is a child at (S6). This means that the decision result is changed from "adult" to "child." Subsequently, a counter Ta for an adult is set to zero (Ta=0) at (S7) and the procedure is repeated.

If the current decision result is "child" at (S1), a converted digital value S of the output current is compared with the occupant determination threshold value Sth at (S9). As a result of this comparison, if the digital value S of the output current is less than the occupant determination threshold value Sth, the counter Ta for an adult is set to zero (Ta=0) at (S14), and the procedure is repeated. If the digital value S of the output current is equal to or greater than the occupant determination threshold value Sth, the value of the counter Ta for an adult is compared with a time limit Tath for an adult at (S10).

As a result of this comparison, if the value of the counter Ta is less than the time limit Tath, the counter Ta is increased by one at (S13) and the procedure is repeated. If the value of the counter Ta is equal to or greater than the time limit Tath, it is decided that an occupant is an adult at (S11). This means that the decision result is changed from "child" to "adult." Subsequently, the counter Tc for a child is set to zero (Tc=0) at (S12) and the procedure is repeated.

The capacitance-type sensor 1 of the sixth embodiment has the same operational effects as the capacitance-type sensor of the third embodiment. Further, the capacitance-type sensor 1 of the present embodiment can detect the weight shift of an occupant in the left and right direction.

According to the occupant detection system of the sixth embodiment, even if a digital value S of the output current is less than an occupant determination threshold value Sth (S2), if a digital value SR of the output current is less than a right output threshold value SRth or a digital value SL of the output current is less than a left output threshold value SLth, the decision result of "adult" is still maintained. Therefore, the position and weight shift of an occupant during driving can be taken into consideration to determine the occupant. The degradation in the accuracy of determining an occupant caused by the position and weight shift of an occupant, in particular, for example, by the turning of a vehicle, can thereby be prevented.

A seventh embodiment differs from the sixth embodiment only in the procedure performed when a digital value of the output current is less than an occupant determination threshold value. Accordingly, only the different point will be described here.

Figure 13:
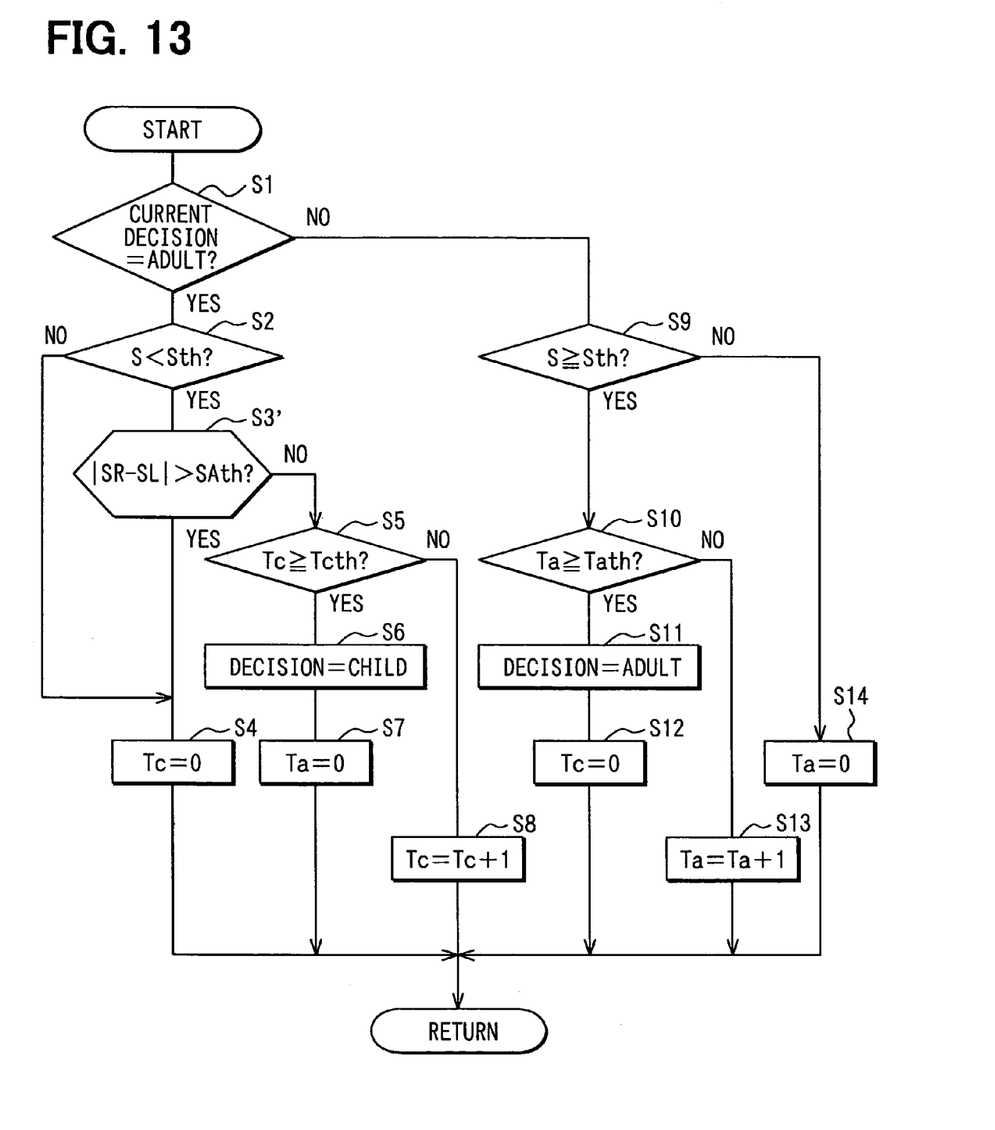
FIG. 13 is a flowchart of an occupant determination process performed by an occupant detection ECU in the occupant detection system of a seventh embodiment of the present invention.

FIG. 13 is a flowchart of the occupant determination process performed by the occupant detection ECU in the occupant detection system of the present embodiment, where like parts in FIG. 12 are indicated by like reference characters. If the current comparison result is "adult" at (S1) and a digital value S of the output current is less than an occupant determination threshold value Sth at (S2), the difference between a digital value SR of the output current and a digital value SL of the output current is calculated. Then, the absolute value of this difference is compared with a difference threshold value SAth at (S3').

As a result of this comparison, if the absolute value is greater than the difference threshold value SAth, a counter Tc for a child is set to zero (Tc=0) at (S4) and the procedure is repeated. If the absolute value is equal to or less than the difference threshold value SAth, a value of the counter Tc for a child is compared with a time limit Tcth for a child at (S5). After that, the same procedure as in the sixth embodiment is performed. The occupant detection system of the present embodiment has the same operational effects as that of the sixth embodiment.

An eighth embodiment differs from the fourth embodiment in that the outputs from the respective electrodes can be detected separately and the upper layer film has a higher permittivity than the lower layer film. Accordingly, only the different points will be described here.

Figure 14A:
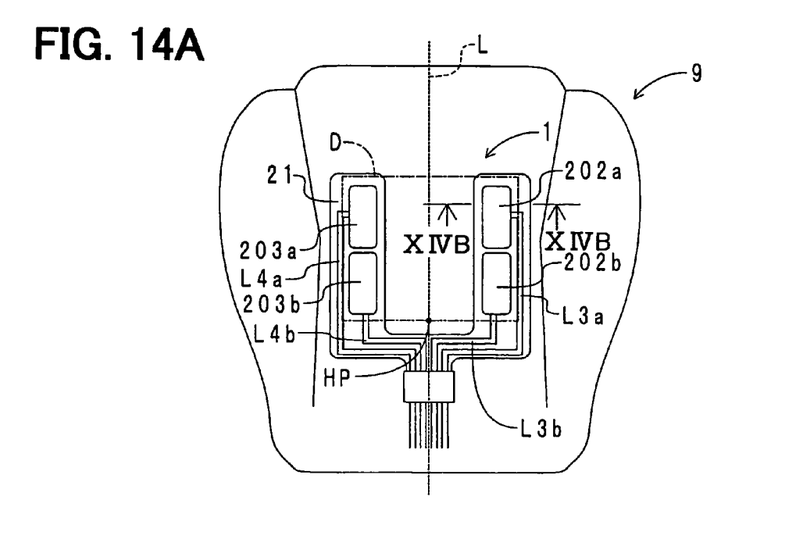
FIG. 14A is a transparent top view of a seat in which the capacitance-type sensor of an eighth embodiment of the present invention is disposed.
Figure 14B:
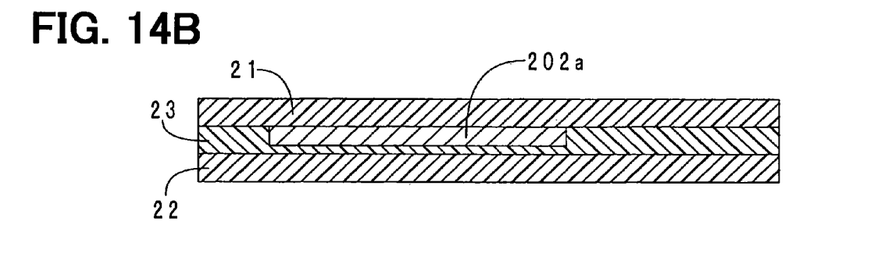
FIG. 14B is a cross-sectional view taken along the line XIVB-XIVB in FIG. 14A.

FIG. 14A is a transparent top view illustrating a seat in which the capacitance-type sensor of the eighth embodiment is disposed, where like parts in FIG. 9 are indicated by like reference characters. FIG. 14B is a cross-sectional view taken along the line II-II in FIG. 14A. In FIG. 14B, for convenience of description, the size of the capacitance-type sensor is exaggerated in the up and down direction. Further, in FIG. 14B, both the skin material above the upper layer film 21 and the cushion material below the lower layer film 22 are omitted, and like parts in FIG. 5B are indicated by like reference characters.

As shown in FIG. 14A, conductors L3a, L3b, L4a, and L4b are separated from each other and electrically connects the right front electrode 202a, right rear electrode 202b, left front electrode 203a, and left rear electrode 203b to an occupant detection ECU (not shown), respectively. The outputs from these four electrodes can thereby be transmitted individually to the occupant detection ECU.

The capacitance-type sensor 1 of the eighth embodiment has the same operational effects as the capacitance-type sensor of the fourth embodiment. Further, the capacitance-type sensor 1 of the eighth embodiment can detect the weight shift of an occupant in the front and rear direction and also in the left and right direction.

The upper layer film 21 shown in FIG. 14B has a higher permittivity than the lower layer film 22. Therefore, even though an area in which each electrode is disposed is relatively small, the degradation of the sensitivity of detecting the outputs from the electrodes can be prevented.

A ninth embodiment differs from the eighth embodiment in that a conductive member is disposed, the conductive member having a higher permittivity than the upper and lower layer films. Accordingly, only the different point will be described.

Figure 15:
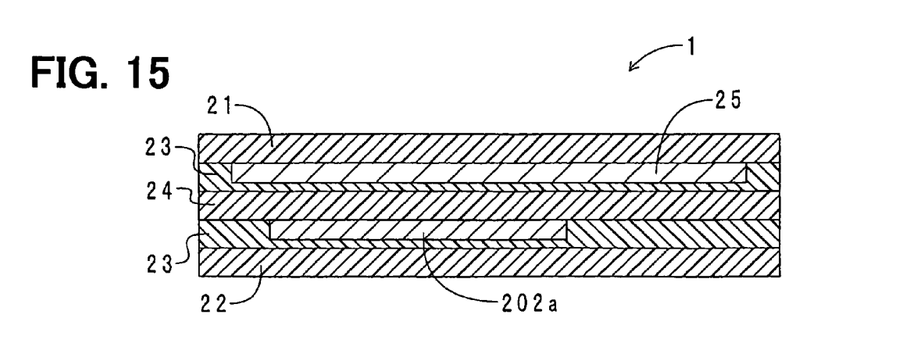
FIG. 15 is a cross-sectional view of the capacitance-type sensor of a ninth embodiment of the present invention.

FIG. 15 is a cross-sectional view of the capacitance-type sensor of the embodiment, where like parts in FIG. 14B are indicated by like reference characters. As shown in FIG. 15, the conductive member 25 is disposed above the right front electrode 202a with an intermediate layer film 24 made of PET in between. The conductive member 25 is a rectangular film having a higher permittivity than the upper layer film 21, the lower layer film 22, and the intermediate film 24. The area of the conductive member 25, spreading in the direction perpendicular to the up and down direction, is wider than the area of the right front electrode 202a, spreading in the direction perpendicular to the up and down direction. Although not shown in FIG. 15, the intermediate layer film and the conductive member are similarly disposed above each of the right rear, left front, and left rear electrodes.

The capacitance-type sensor 1 of the ninth embodiment has the same operational effects as the capacitance-type sensor of the eighth embodiment. Further, according to the capacitance-type sensor 1 of the ninth embodiment, the degradation of the sensitivity of detecting the output from each electrode can be further prevented thanks to the wider area of the conductive member 25.

A number of embodiments of the capacitance-type sensor and the occupant detection system according to the invention have been described above. Embodiments, however, are not particularly limited to the above embodiments. Those skilled in the art will recognize that further variations and modifications are possible within the scope of the invention.

For example, although the electrode is sealed between the films in the above embodiments, it may also be formed with a conductive cloth, a thread-like metal, or an electrically conductive paint.

In the above embodiments, the seat frame 92 is used to form a capacitor between itself and the electrode, but the body of a vehicle may also be used. Aside from the seat frame 92, an earth electrode may also be disposed to form the capacitor. An electrode supplied with a constant voltage may also be disposed using, for example, a 5-volt power supply (not shown) used in the occupant detection ECU 3.

In the above embodiments, the electrode is disposed in the sitting area of a front seat, but it may be disposed in a rear seat. Further, in the above embodiment, the upper layer film 21 and the lower layer film 22 are both made of PET, but they may be made of, for example, polyethylene naphthalate (PEN) or another material capable of serving the principles of the present invention.

What is claimed is:

1. A capacitance-type sensor for detecting a condition of an occupant on a vehicle seat, the capacitance-type sensor comprising at least one electrode located within a detection area of the vehicle seat for generating an electric field over the detection area, wherein
   the vehicle seat has a cushion, which is adapted to receive thighs and buttocks of a human body, and which includes the detection area,
   the detection area is formed based on a surface pressure distribution of an adult body sitting on the cushion and located only in front of a hip point design point of the cushion, which corresponds to a pivot center of a torso and thigh of a human body.

2. The capacitance-type sensor according to claim 1, wherein the detection area is set so as to extend from 0 mm to 200 mm in front of the hip point design point.

3. The capacitance-type sensor according to claim 1, wherein the detection area is substantially symmetrically disposed to a left direction and a right direction of a center line passing through the hip point design point on the seat.

4. The capacitance-type sensor according to claim 3, wherein end positions of the detection area in the left and right direction is set to from 75 mm to 125 mm in both the left and right directions with respect to the hip point design point.

5. The capacitance-type sensor according to claim 1, wherein the detection area is defined on the basis of a distance between the electrode and a body of an adult when the adult is seated.

6. The capacitance-type sensor according to claim 5, wherein:
   the cushion has a skin material pressed by an occupant sitting therein;

the electrode is disposed below the skin material; and the detection area is set in an area receiving a surface pressure equal to or greater than a predetermined surface pressure value according to the surface pressure distribution obtained when the adult is seated, the predetermined surface pressure value being a surface pressure that completes a buckling of the skin material.

7. The capacitance-type sensor according to claim 6, wherein the detection area is defined on the basis of a common area between: an area receiving a surface pressure equal to or greater than the predetermined surface pressure value according to the surface pressure distribution obtained when the adult sits normally in the seat; and an area receiving a surface pressure equal to or greater than the predetermined surface pressure value according to the surface pressure distribution obtained when the adult sits forward in the seat.

8. The capacitance-type sensor according to claim 6, wherein the predetermined surface pressure value is set to 4 kPa.

9. The capacitance-type sensor according to claim 1, wherein the electrode includes a plurality of electrode elements connected to the same voltage level.

10. The capacitance-type sensor according to claim 9, wherein the plurality of electrode elements are disposed in parallel with each other in a left and right direction in the detection area.

11. The capacitance-type sensor according to claim 9, wherein the plurality of electrode elements are disposed in parallel with each other in a front and rear direction in the detection area.

12. The capacitance-type sensor according to claim 1, wherein the plurality of electrode elements are able to provide individual outputs.

13. The capacitance-type sensor according to claim 12, wherein the plurality of electrode elements are disposed in parallel with each other in a left and right direction in the detection area.

14. The capacitance-type sensor according to claim 12, wherein the plurality of electrode elements are disposed in parallel with each other in a front and rear direction in the detection area.

15. The capacitance-type sensor according to claim 1, further comprising:

an upper layer film that covers the top of the electrode; and a lower layer film that covers the bottom of the electrode and seals the electrode between itself and the upper layer film, wherein a permittivity of the upper layer film is set to be higher than tat of the lower layer film.

16. The capacitance-type sensor according to claim 1, further comprising:

an upper layer film that covers the top of the electrode;

a lower layer film that coven the bottom of the electrode and seals the electrode between itself and the upper layer film; and a conductive member that is interposed between the upper and lower layer films and disposed above the electrode, wherein a permittivity of the conductive member is set to be higher than those of the upper and lower layer films.

17. The capacitance-type sensor according to claim 16, wherein the conductive member has a larger area than the electrode.

18. An occupant detection system comprising:

a capacitance-type sensor disposed in a detection area of a seat that is defined on the basis of a surface pressure distribution in the seat obtained when an adult is seated and disposed in front of a hip point design point of the seat, the hip point design point corresponding to a pivot center of a torso and thigh of a human body, the sensor having a plurality of electrodes disposed in the detection area; and an occupant detection ECU which determines an occupant according to outputs from the plurality of electrodes, the occupant detection ECU is configured so that:

when a previous decision result is "adult," the occupant detection ECU maintains the decision result on the condition that: an entire output total value is less than an entire output threshold value, the entire output total value being a total sum of the outputs from the electrodes disposed in all of the detection area; and one of a first and a second partial output value is less than a first and a second partial output threshold value, respectively, wherein the first partial output total value is a total sum of the outputs from the electrodes disposed in a first part of the detection area and the second partial output total value is a total sum of the outputs from the electrodes disposed in a second part of the detection area.

19. The occupant detection system according to claim 18, wherein the first part of the detection area is set to a right half of the detection area and the second part of the detection area is set to a left half of the detection area.

20. The occupant detection system according to claim 18, wherein the first part of the detection area is set to a front half of the detection area and the second part of the detection area is set to a rear half of the detection area.

21. An occupant detection system comprising:

a capacitance-type sensor disposed in a detection area of a seat that is defined on the basis of a surface pressure distribution in a seat obtained when an adult is seated end disposed in front of a hip point design point of the seat, the hip point design point corresponding to a pivot center of a torso and thigh of a human body, the sensor having a plurality of electrodes disposed in the detection area; and an occupant detection ECU that determines an occupant according to outputs from the plurality of electrodes, the occupant detection ECU is configured so that:

when a previous decision result is "adult", the occupant detection ECU maintains the decision result on the condition that: an entire output total value is less than an entire output threshold value, the entire output total value being a total sum of the outputs from the electrodes disposed in all of the detection area; and an absolute value of a difference between a first partial output total value which is the total sum of the outputs from the electrodes disposed in a first part of the detection area, and a second partial output total value which is the total sum of the outputs from the electrodes disposed in a second part of the detection area, exceeds a difference threshold value.

22. The occupant detection system according to claim 21, wherein the first part of the detection area is set to a right half of the detection area and the second part of the detection area is set to a left half of the detection area.

23. The occupant detection system according to claim 21, wherein the first part of the detection area is set to a front half of the detection area and the second part of the detection area is set to a rear half of the detection area.

24. The occupant detection system according to claim 21, wherein the detection area is disposed only in front of the hip point design point and in a seat cushion of the seat.

25. The occupant detection system according to claim 18, wherein the detection area is disposed only in front of the hip point design point and in a seat cushion of the seat.

\* \* \* \* \*